US012531033B2

(12) United States Patent
Liu

(10) Patent No.: US 12,531,033 B2
(45) Date of Patent: Jan. 20, 2026

(54) BACKLIGHT MODULE BRIGHTNESS CALIBRATION METHOD, DISPLAY DEVICE THEREOF, AND BRIGHTNESS CALIBRATION DEVICE THEREOF

(71) Applicant: TCL CHINA STAR OPTOELECTRONICS TECHNOLOGY CO., LTD., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 580 days.

(21) Appl. No.: 17/600,459

(22) PCT Filed: Aug. 26, 2021

(86) PCT No.: PCT/CN2021/114777
§ 371 (c)(1),
(2) Date: Sep. 30, 2021

(87) PCT Pub. No.: WO2023/015616
PCT Pub. Date: Feb. 16, 2023

(65) Prior Publication Data

US 2024/0029672 A1 Jan. 25, 2024

(30) Foreign Application Priority Data

Aug. 12, 2021 (CN) ......................... 202110926711.1

(51) Int. Cl.
*G09G 3/34* (2006.01)

(52) U.S. Cl.
CPC ... *G09G 3/3426* (2013.01); *G09G 2320/0285* (2013.01); *G09G 2320/0626* (2013.01); *G09G 2320/0693* (2013.01)

(58) Field of Classification Search
None
See application file for complete search history.

(56) References Cited

U.S. PATENT DOCUMENTS 10,283,037 B1 * 5/2019 Far ........................... G09G 3/32
2014/0176518 A1 * 6/2014 Min ......................... G09G 3/20
345/207
2014/0362129 A1 12/2014 Tanaka et al.
(Continued)

FOREIGN PATENT DOCUMENTS

CN 104299565 1/2015
CN 106847192 6/2017
(Continued)

*Primary Examiner* — Benjamin C Lee
*Assistant Examiner* — Emily J Frank

(57) ABSTRACT

The present application discloses a backlight module brightness calibration method. The method includes: a brightness detection step, a grayscale sorting step, a grayscale calibration table generation step, and a grayscale calibration table output step. The present application re-sorts first grayscale values of a grayscale range of backlight divisions of a display device according to actual brightness values to obtain a grayscale calibration table to further mitigate or avoid a technical issue of a discontinuous or jump-varying grayscale transition of a backlight module of a conventional display device.

12 Claims, 9 Drawing Sheets

(56) References Cited

U.S. PATENT DOCUMENTS

| | | | | |
|---|---|---|---|---|
| 2019/0156770 | A1* | 5/2019 | Zha | G09G 3/342 |
| 2019/0348001 | A1* | 11/2019 | Shi | G09G 3/32 |
| 2020/0234657 | A1* | 7/2020 | Huang | G09G 3/3607 |
| 2023/0030225 | A1* | 2/2023 | Lee | G09G 3/3426 |

FOREIGN PATENT DOCUMENTS

| | | |
|---|---|---|
| CN | 109005622 | 12/2018 |
| CN | 109326252 | 2/2019 |
| CN | 110473502 | 11/2019 |
| CN | 111326099 | 6/2020 |
| CN | 111415606 | 7/2020 |
| CN | 111696475 | 9/2020 |
| JP | H10153982 | 6/1998 |
| JP | 2005-266452 | 9/2005 |
| JP | 2006-098614 | 4/2006 |
| JP | 2008-288969 | 11/2008 |
| JP | 2009-186800 | 8/2009 |

* cited by examiner

BACKLIGHT MODULE BRIGHTNESS CALIBRATION METHOD, DISPLAY DEVICE THEREOF, AND BRIGHTNESS CALIBRATION DEVICE THEREOF

RELATED APPLICATIONS

This application is a National Phase of PCT Patent Application No. PCT/CN2021/114777 having International filing date of Aug. 26, 2021, which claims the benefit of priority of Chinese Patent Application No. 202110926711.1 filed on Aug. 12, 2021. The contents of the above applications are all incorporated by reference as if fully set forth herein in their entirety.

FIELD AND BACKGROUND OF THE INVENTION

The present application relates to a field of displays, especially to a backlight module brightness calibration method, a display device thereof, and a brightness calibration device thereof.

At present, with consumers' higher demands for image quality of television, many new display technologies appear, an active matrix mini-light emitting diode (AM-mini-LED) technology has received widespread attention.

Because a conventional liquid crystal display device (LCD) backlight module has limits such as defects including large power consumption and low contrast, backlight modules have been developed toward a direction of local dimming. An AM-mini-LED backlight module has characteristics such as local light dimming, low power consumption, and high contrast, can further applied to glass display panels for large size mass production, and gets attention extensively.

With reference to FIG. 1, a backlight module of a conventional AM-mini-LED display device comprises a plurality of divisions arranged in an array, each of the divisions comprises a gate line, a data line, at least one mini-LED, a metal oxide semiconductor field-effect transistor (MOSFET) connected to the mini-LED, a thin film transistors (TFT) connected to the gate line, the data line, and the MOSFET, and a storage capacitor (Cst) connected between the MOSFET and the TFT. When the divisions operate, the TFT is switched on by a gate line signal, and the data lines signal electrifies the storage capacitor to be able to keep the MOSFET continuously switched on such that the mini-LED continuously emits light. Controlling a power-on time of the MOSFET controls brightness of the mini-LED to present a specific grayscale value (for example, grayscale value 0 to 63) in a predetermined grayscale range to achieve a corresponding brightness, which achieves a function of divisional light adjustment.

Ideally, the storage capacitor can keep an original voltage after charged. However, in fact light leakage exits (light irradiates TFT to excite charges to move), the voltage would continuously decrease after within a period, which results in variation of conductive current of the MOSFET.

Furthermore, with reference to FIG. 2, because different first grayscale values has different leakage degrees, it causes a discontinuous grayscale range of the backlight module, and finally results in that light emitted out from tje backlight module has discontinuous grayscale transition. For example, when brightness of mini-LEDs of one division of the backlight module gradually increases (grayscale value increases from 0 to 63), because of the light leakage issue, it results in discontinuous grayscale variation of the division from darkness to brightness. For example, in the divisions, brightness of the grayscale value 25 with a minor leakage is greater than brightness of the grayscale value 27 with a serious leakage degree.

Under a precondition of the divisions of the above backlight module having leakage issues, when the display panel outputs an image frame in which all of the divisions have the same brightness (i.e., the same grayscale value), the divisions under the grayscale value having different leakage degrees result in a issue that the image frame supposed to have consistent brightness instead presents uneven brightness, which causes poor display of the display device.

Under a precondition of the divisions of the above backlight module having leakage, when the display panel outputs an image with brightness gradually increasing from left to right, the divisions under the grayscale value having different leakage degrees result in the posterization issue that the image frame supposed to have an even low-to-high brightness transition from left to right instead presents a discontinuous brightness transition.

Because the leakage is material characteristics and difficult to overcome, other effective ways for easing or avoiding the technical issue such as posterization of a discontinuous and jump-varying grayscale transition of the backlight module is required.

SUMMARY OF THE INVENTION

Technical Issue

The embodiment of the present application provides a backlight module brightness calibration method, a display device thereof, and a brightness calibration device thereof that re-sort a grayscale value of a grayscale range of each of the backlight divisions of the backlight module of the display device, according to actual detected brightness from darkness to brightness and re-arrange and establish a grayscale calibration table according to the grayscale value re-sorted based on the actual brightness values to solve the technical issue of the conventional display device having a discontinuous or jump-varying grayscale transition of the backlight module.

Technical Solution

In an aspect, the present application provides a backlight module brightness calibration method for a display device, comprising:

a brightness detection step comprising detecting a plurality of actual brightness values of a plurality of first grayscale values of at least one backlight division of a backlight module of the display device;

a grayscale sorting step comprising re-sorting the first grayscale values according to a brightness value sequence of the actual brightness values;

a grayscale calibration table generation step comprising establishing a grayscale calibration table corresponding to the backlight division according to the first grayscale values resorted, wherein the grayscale calibration table comprises a plurality of second grayscale values, the second grayscale values are mapped to the first grayscale values re-sorted, and the actual brightness value corresponding to any smaller one of the second grayscale values is less than the actual brightness value corresponding to any greater one of the second grayscale values; and a grayscale calibration table output step comprising outputting the grayscale calibration table.

In some embodiments of the present application, the brightness detection step further comprises: detecting the actual brightness values of the first grayscale values in a grayscale range corresponding to each of the backlight divisions of the backlight module of the display;

the grayscale calibration table generation step further comprises: establishing the grayscale calibration tables corresponding to the backlight divisions according to the first grayscale values resorted in each of the backlight divisions, wherein each of the grayscale calibration tables comprises the second grayscale values, the second grayscale values are mapped to the first grayscale values re-sorted, and the actual brightness value corresponding to any smaller one of the second grayscale values is less than the actual brightness value corresponding to any greater one of the second grayscale values; and the grayscale calibration table output step further comprises: connecting a brightness control unit of the backlight module through a transmission line to output and store the grayscale calibration tables into the brightness control unit.

In some embodiments of the present application, after the grayscale calibration table generation step, the method further comprises a division grayscale alignment step comprising fine-adjusting a brightness value of a light emitting element of each of the backlight divisions such that the actual brightness values corresponding to the same second grayscale value in the grayscale calibration tables are equal.

In some embodiments of the present application, in the grayscale sorting step, the brightness value sequence is a sequence of the actual brightness values in an increasing arrangement or a decreasing arrangement.

In some embodiments of the present application, each of the backlight divisions comprises a light emitting element, the light emitting element is configured to output the actual brightness values according to the first grayscale values in the grayscale range; and the brightness control unit is configured to control each of the backlight divisions to perform divisional light adjustment.

In some embodiments of the present application, the brightness detection step further comprises: detecting the actual brightness values of the first grayscale values in a grayscale range corresponding to each of the backlight divisions of the backlight module of the display device;

the grayscale calibration table generation step further comprises: establishing the grayscale calibration tables corresponding to the backlight divisions according to the first grayscale values resorted in each of the backlight divisions, wherein each of the grayscale calibration tables comprises the second grayscale values, the second grayscale values are mapped to the first grayscale values re-sorted, and the actual brightness value corresponding to any smaller one of the second grayscale values is less than the actual brightness value corresponding to any greater one of the second grayscale values;

the grayscale calibration table output step further comprises: connecting a brightness control unit of the backlight module through a transmission line to output and store the grayscale calibration tables into the brightness control unit;

after the grayscale calibration table generation step, the method further comprises a division grayscale alignment step comprising fine-adjusting a brightness value of a light emitting element of each of the backlight divisions such that the actual brightness values corresponding to the same second grayscale value in the grayscale calibration tables are equal;

in the grayscale sorting step, the brightness value sequence is a sequence of the actual brightness values in an increasing arrangement or a decreasing arrangement;

each of the backlight divisions comprises a light emitting element, the light emitting element is configured to output the actual brightness values according to the first grayscale values in the grayscale range; and the brightness control unit is configured to control each of the backlight divisions to perform divisional light adjustment.

In another aspect, the present application provides a display device, comprising:

a backlight module, wherein the backlight module is divided into a plurality of backlight divisions, and the backlight module comprises a brightness control unit configured to control each of the backlight divisions to perform divisional light adjustment; and a display panel disposed on the backlight module, wherein the brightness control unit comprises a grayscale driving reference table and a grayscale calibration table, the grayscale driving reference table comprise a plurality of first grayscale values of at least one of the backlight divisions and a driving value corresponding each of the first grayscale values, the grayscale calibration table comprises a plurality of second grayscale values, each of the second grayscale values is mapped to one of the first grayscale values of the grayscale driving reference table, and an actual brightness value of the backlight division corresponding to any smaller one of the second grayscale values is less than an actual brightness value of the backlight division of any greater one of the second grayscale values.

In some embodiments of the present application, the brightness control unit comprises a plurality of grayscale driving reference tables, and each of the grayscale driving reference tables corresponds to one of the backlight divisions.

In some embodiments of the present application, each of the backlight divisions comprises a light emitting element, the light emitting element is configured to output the actual brightness values according to the first grayscale values in the grayscale range.

In some embodiments of the present application, the brightness control unit comprises a plurality of grayscale driving reference tables, and each of the grayscale driving reference tables corresponds to one of the backlight divisions; and each of the backlight divisions comprises a light emitting element, and the light emitting element is configured to output the actual brightness values according to the first grayscale values in the grayscale range.

In another aspect, the present application provides a backlight module brightness calibration device for a display device, comprising:

a brightness detection module configured to detect a plurality of actual brightness values of a plurality of first grayscale values of at least one of the backlight divisions of a backlight module of the display device;

a grayscale sorting module configured to resort the first grayscale values according to a brightness value sequence of the actual brightness values;

a grayscale calibration table generation module configured to establish a grayscale calibration table corresponding to the backlight division according to the first grayscale values resorted, wherein the grayscale calibration table comprises a plurality of second grayscale values, the second grayscale values are mapped to the first grayscale values re-sorted, and the actual brightness value corresponding to any smaller one of the second grayscale values is less than the actual brightness value corresponding to any greater one of the second grayscale values; and a grayscale calibration table output module configured to output the grayscale calibration table.

In some embodiments of the present application, the brightness detection module is further configured to: detecting the actual brightness values of the first grayscale values in a grayscale range corresponding to each of the backlight divisions of the backlight module of the display device;

the grayscale calibration table generation module is further configured to establish the grayscale calibration tables corresponding to the backlight divisions according to the first grayscale values resorted in each of the backlight divisions, wherein each of the grayscale calibration table comprises a plurality of second grayscale values, the second grayscale values are mapped to the first grayscale values re-sorted, and the actual brightness value corresponding to any smaller one of the second grayscale values is less than the actual brightness value corresponding to any greater one of the second grayscale values; and the grayscale calibration table output module is further configured to connect a brightness control unit of the backlight module through a transmission line to output and store the grayscale calibration tables into the brightness control unit.

Advantages

The present application at least comprises advantages as follows:

The display device, the display device backlight module brightness calibration method, and the backlight module brightness calibration device for the display device provided by the present application, re-sort the first grayscale values of the grayscale range of the backlight divisions according to actual brightness values of the display device to acquire the grayscale calibration tables, and output and store the grayscale calibration tables to the brightness control unit to control the backlight module to display correct brightness, which further mitigate or avoid the technical issue of discontinuity or jump variation of a grayscale transition of a backlight module of a conventional display device.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

An embodiment of the present application provides a backlight module brightness calibration method, a display device thereof, and a brightness calibration device thereof that are described as follows respectively. It should be explained that, a description order of the embodiments has no limit the preferring order of the embodiments.

Figure 1:
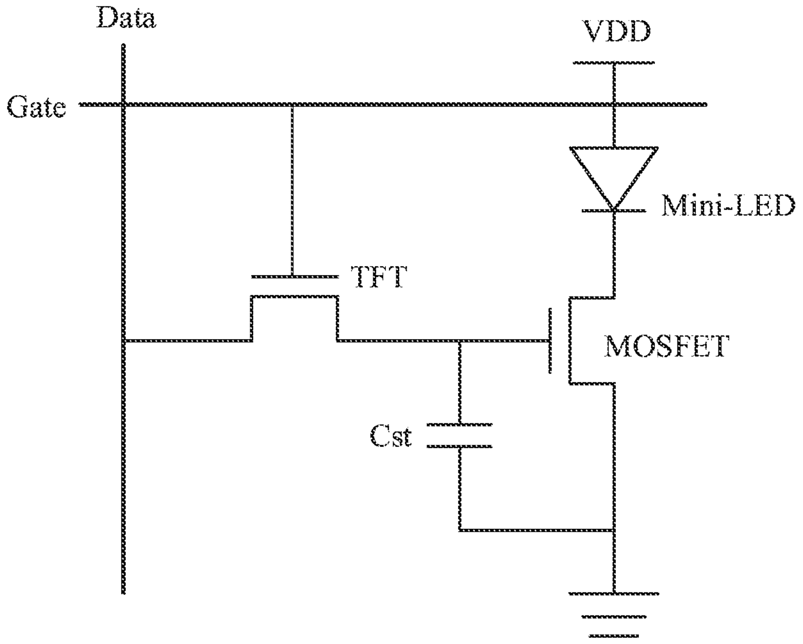
FIG. 1 PRIOR ART
FIG. 1 is a schematic circuit framework diagram of of a single division of a conventional active matrix mini light emitting diode (AM-mini-LED) backlight module.
Figure 2:
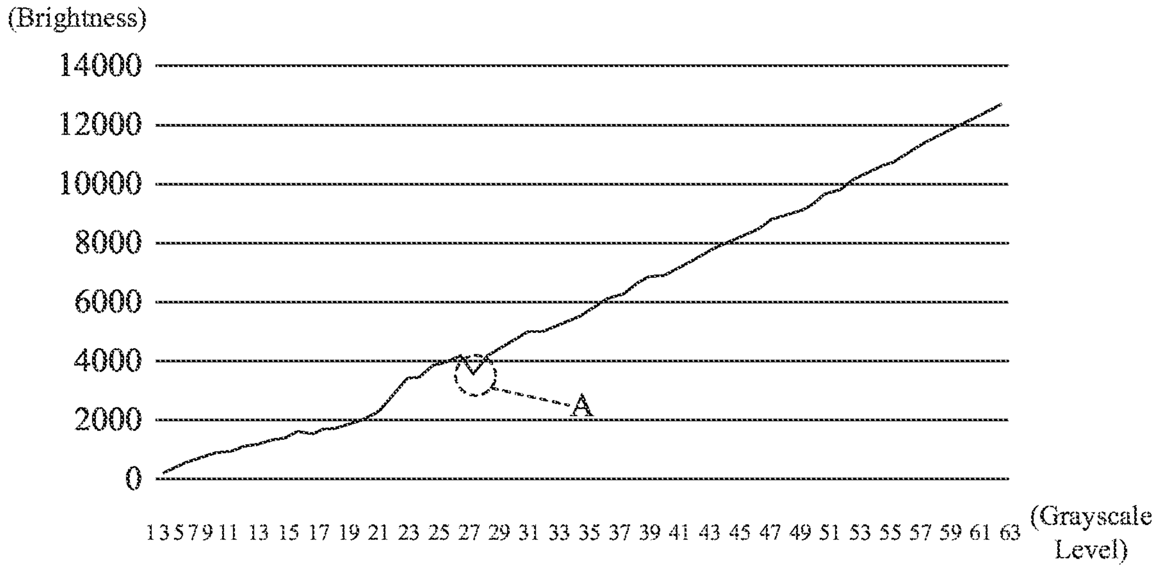
FIG. 2 PRIOR ART
FIG. 2 is a grayscale-brightness relation chart of the divisions of the conventional AM-mini-LED backlight module in FIG. 1, wherein leakage and lowered brightness occur in a broken circle A and result in the grayscale to be discontinuous or jump-varying.
Figure 3:
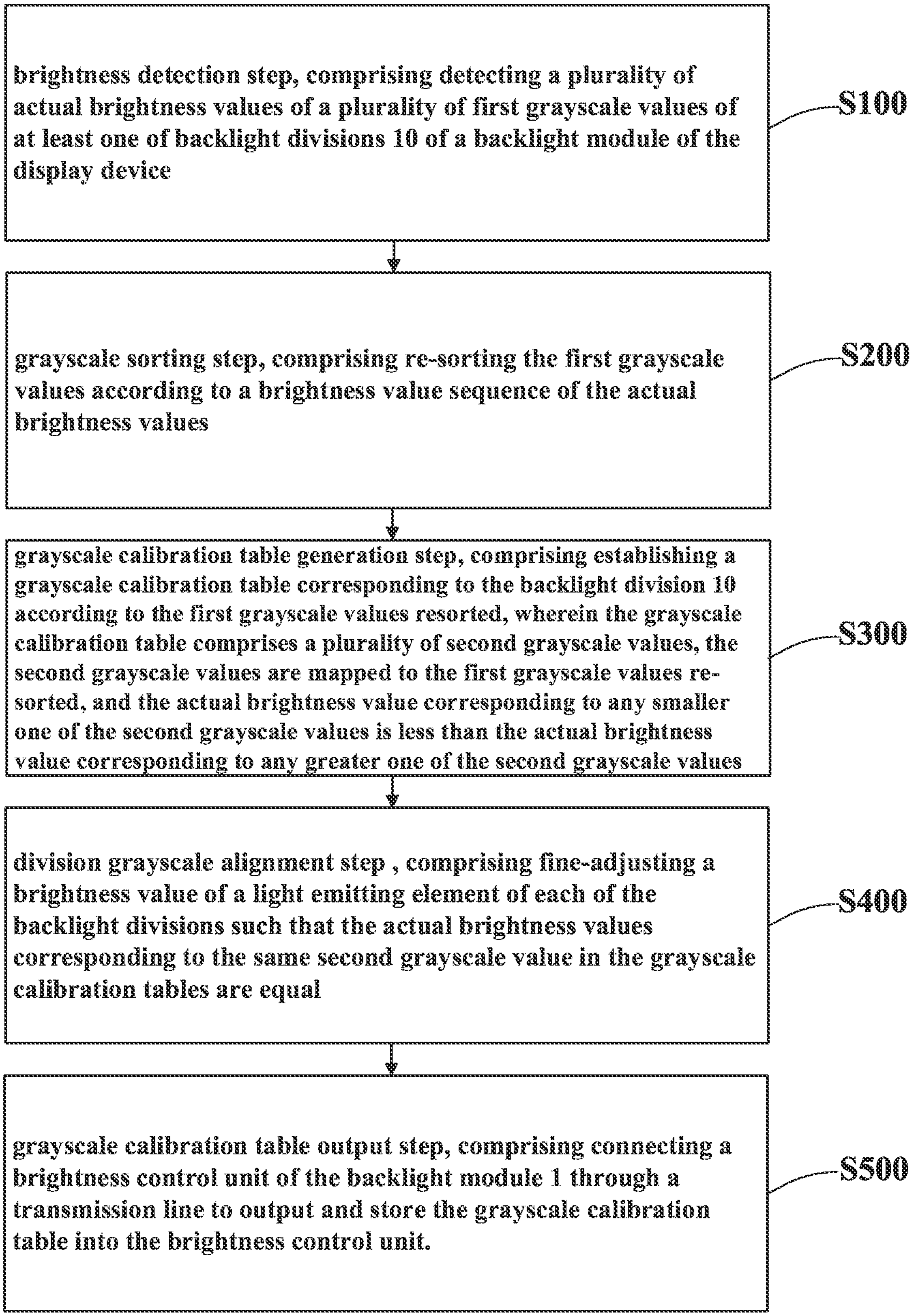
FIG. 3 is a flowchart of a display device backlight module brightness calibration method provided by the embodiment of the present application.
Figure 4:
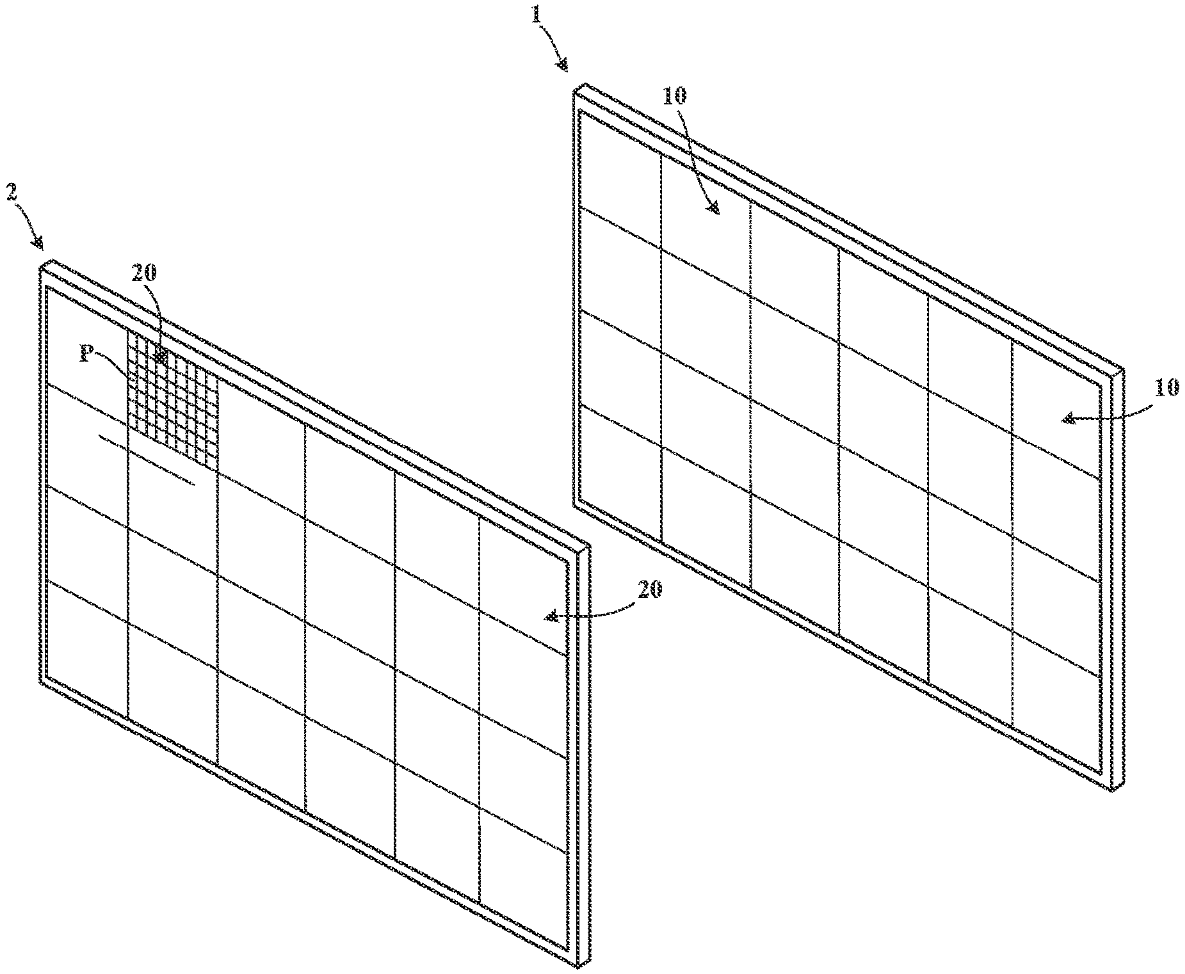
FIG. 4 is a schematic exploded perspective view of a display device backlight module and a corresponding display device of the embodiment of the present application.

With reference to FIGS. 3 and 4, the present application provides the display device backlight module brightness calibration method comprising: a brightness detection step S100, a grayscale sorting step S200, a grayscale calibration table generation step S300, and a grayscale calibration table output step S500.

The brightness detection step S100 comprises detecting a plurality of actual brightness values of a plurality of first grayscale values of at least one of backlight divisions 10 of a backlight module of the display device. Particularly, the brightness detection step S100 can perform detection by an optical meter.

The grayscale sorting step S200 comprises re-sorting the first grayscale values according to a brightness value sequence of the actual brightness values.

The grayscale calibration table generation step S300 comprises establishing a grayscale calibration table corresponding to the backlight division 10 according to the first grayscale values resorted, wherein the grayscale calibration table comprises a plurality of second grayscale values, the second grayscale values are mapped to the first grayscale values re-sorted, and the actual brightness value corresponding to any smaller one of the second grayscale values is less than the actual brightness value corresponding to any greater one of the second grayscale values.

Figure 6:
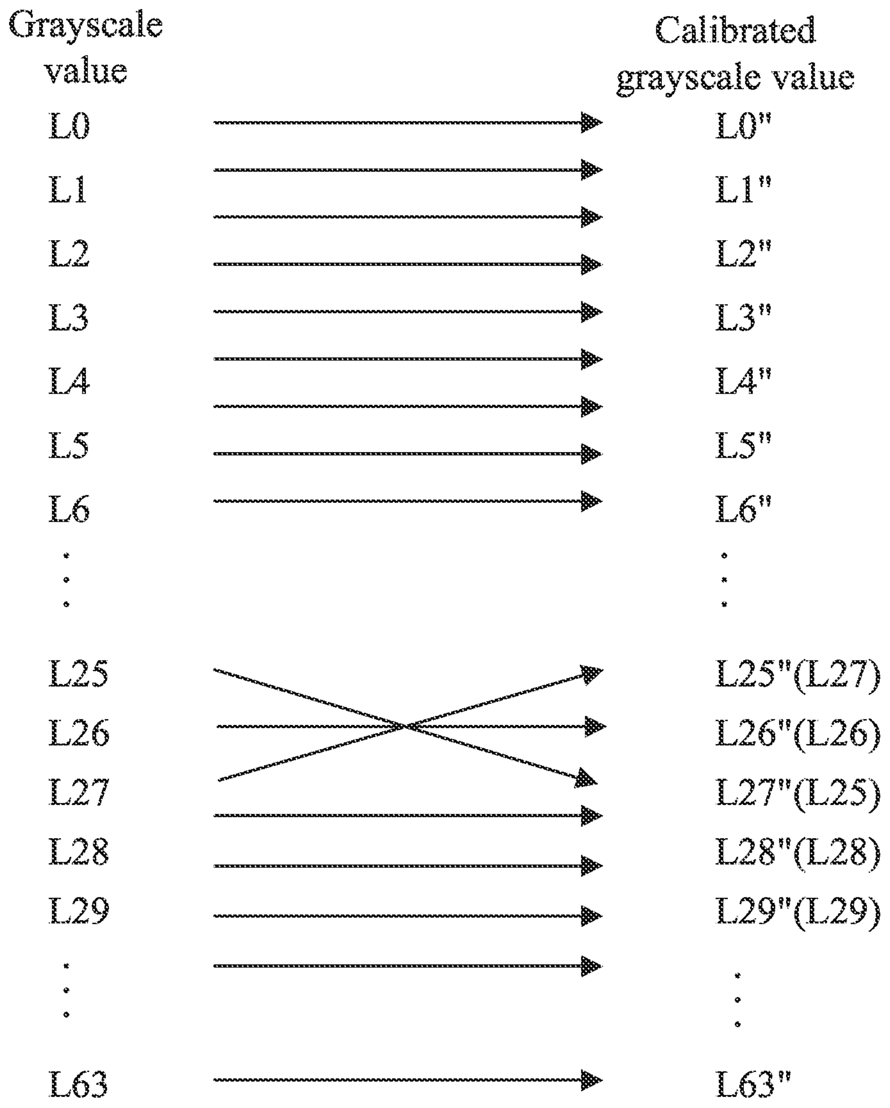
FIG. 6 is a schematic view of a grayscale sorting step of a display device backlight module brightness calibration method provided by the embodiment of the present application.
Figure 7:
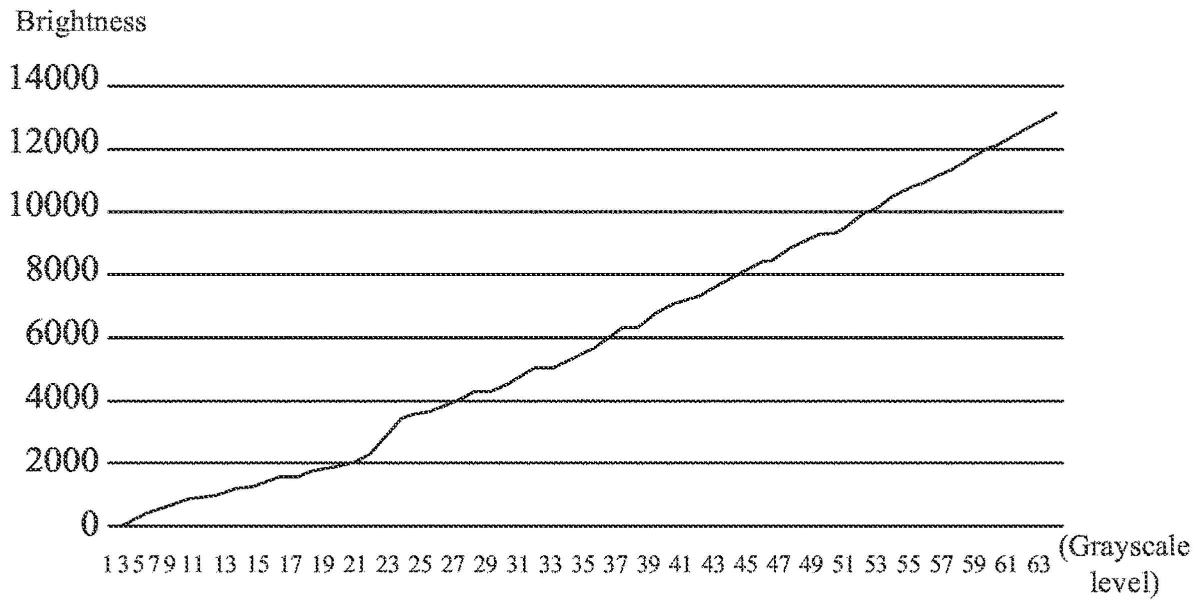
FIG. 7 is a grayscale-brightness relation chart of the backlight divisions of the present application display device backlight module in FIG. 6.

With reference to FIGS. 6 and 7, a specific condition of an embodiment of the present application is taken as an example for explanation but is not limited thereto. In the brightness detection step S100, the grayscale range, for example, comprises 64 levels, and comprising first grayscale values L0 to L63, each of the first grayscale values L0-L63 corresponds to a brightness value of the backlight division. The originally set first grayscale value L0 corresponds to a minimum brightness value, the first grayscale values L63 correspond to a maximum brightness value. Remaining first grayscale values sequentially correspond to brightness values from low to high of the backlight division. However, the leakage issue of the light emission assembly in the divisions of the backlight module results in discontinuous darkness to brightness grayscale variation of the divisions. For example, in the divisions, a brightness value of the first grayscale value 25 with a minor leakage degree is greater than a brightness value of the first grayscale value 27 with a serious leakage degree and results in that the actual brightness value of the first grayscale value 25 is greater than the actual brightness value of the first grayscale value L26, and the actual brightness value of the first grayscale value L27 is less than the actual brightness value of the first grayscale value L26 的 Therefore, first in the brightness detection step S100, the actual brightness value of each of the first grayscale values L0-L63 is determined. Then, in the grayscale sorting step S200, the first grayscale values L27 and the first grayscale values L25 are exchanged according to the actual brightness values. Then, in the grayscale calibration table generation step S300, a grayscale calibration table from level 0 至 to level 63 is established according to the re-sorted the first grayscale values L0 to L63, which comprising a plurality of second grayscale values L0 "至 to L63". The second grayscale values are mapped to the first grayscale values re-sorted. For example, the second grayscale values L25" and L27" are mapped to first grayscale values L27 and L25 respectively, and actual brightness values corresponding to the second grayscale values L25" and L27" are the actual brightness values corresponding to L27 and L25 in the original grayscale range. As such, the issue of the discontinuous and jump-varying grayscale of the first grayscale values L25 to L27 of the grayscale range has been solved. Furthermore, the backlight division emitting light according to the grayscale calibration table, a relationship between of the second grayscale values of the backlight division and actual brightness values is as shown a grayscale-brightness relation chart in FIG. 7, the actual brightness value increases according to the increasing first grayscale value, and therefore the issue of the discontinuous and jump-varying grayscale is solved.

The grayscale calibration table output step S500 comprises connecting a brightness control unit of the backlight module 1 through a transmission line to output and store the grayscale calibration table into the brightness control unit. Particularly, the brightness control unit controls the backlight module output a calibrated backlight brightness value corresponding to the image according to the grayscale calibration table.

In a preferred embodiment of the present application, the brightness detection step S100 further comprises: detecting the actual brightness values of the first grayscale values in a grayscale range corresponding to each of the backlight divisions of the backlight module 1 of the display;

the grayscale calibration table generation step S300 further comprises: establishing the grayscale calibration tables corresponding to the backlight divisions 10 according to the first grayscale values resorted in each of the backlight division 10*s*, wherein each of the grayscale calibration tables comprises the second grayscale values, the second grayscale values are mapped to the first grayscale values re-sorted, and the actual brightness value corresponding to any smaller one of the second grayscale values is less than the actual brightness value corresponding to any greater one of the second grayscale values; and the grayscale calibration table output step S500 further comprises: connecting a brightness control unit of the backlight module through a transmission line to output and store the grayscale calibration tables into the brightness control unit.

Specifically, driver transistor MOSFETs or light emission assemblies L in different ones of the backlight divisions 10 probably are different in performance to result in first grayscale values in the different ones of the backlight divisions 10 corresponding to different actual brightness values. Therefore, implementing backlight module brightness calibration to each backlight division 10 can acquire a better effect.

Specifically, a plurality of the grayscale calibration tables can also be integrated into a large grayscale calibration table according to actual demands, the present application has no limit thereto.

In a preferred embodiment of the present application, after the grayscale calibration table generation step S300, the method further comprises a division grayscale alignment step S400 comprising fine-adjusting a brightness value of a light emitting element of each of the backlight divisions such that the actual brightness values corresponding to the same second grayscale value in the grayscale calibration tables are equal.

Specifically, even backlight module brightness calibration has been implemented for different ones of the backlight divisions 10, brightness difference probably exists between different ones of the backlight divisions 10, and therefore the division grayscale alignment step S400 is needed.

Furthermore, in a qualified display device, employed light emitting elements L should be similar in light emission quality, and actual brightness values of the light emitting elements L under each first grayscale value should also be similar. Therefore, in the division grayscale alignment step S400, an alignment way of the grayscale calibration tables only requires to fine-adjust the lighting-up time length of the light emitting element L in each of the backlight divisions 10 under the first grayscale value such that the actual brightness values corresponding to the same second grayscale values in the grayscale calibration tables can be the same.

In a preferred embodiment of the present application, in the grayscale sorting step S200, the brightness value sequence is an increasing arrangement or an decreasing arrangement of the actual brightness values.

Figure 5:
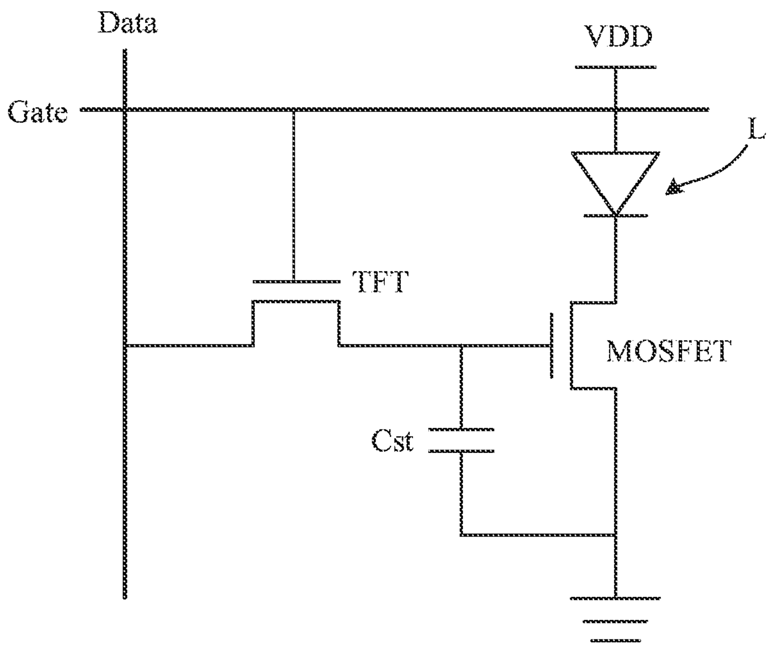
FIG. 5 is a schematic circuit framework diagram of a single backlight division of display device backlight module of the present application.

With reference to FIGS. 4 and 5, in a preferred embodiment of the present application, each of the backlight divisions 10 comprises a light emitting element L, the light emitting element L is configured to output the actual brightness values according to the first grayscale values in the grayscale range. the brightness control unit is configured to control each of the backlight divisions 10 to perform divisional light adjustment.

With reference to FIG. 4, the display device comprises a display panel 2 combining the backlight module 1, the display panel 2 comprises a plurality of pixel sets corresponding to the backlight divisions 10, and the pixel sets 20 display according to a plurality of pixel first grayscale values in a pixel grayscale range. the pixel grayscale range of the pixel sets 20 is greater than the grayscale range of the backlight divisions 10. Furthermore, the pixel set 20 comprises a plurality of unit pixels P. Particularly, the light emitting element L is a light emitting diode (Light Emitting Diode, LED), the light emitting diode can be a mini-light emitting diode (mini-LED) or a micro-light emitting diode (Micro-LED). Particularly, the display panel 2 is an open cell display panel, and forms a complete display device after combining the backlight module 1.

With reference to FIG. 5, in a preferred embodiment of the present application, each of the backlight divisions of the display device 的 comprises a gate line, a data line, a light emitting element L, a driver transistor (for example: metal-oxide-semiconductor field-effect transistor (MOSFET)) connected to the light emitting element L, a switch transistor (for example: thin film transistor (TFT)) connected to the gate line, the data line, and the driver transistor, and a storage capacitor (Cst) connected between the driver transistor MOSFET and the switch transistor TFT. When the backlight divisions 10 operate, the TFT is switched on by a gate line signal, and the data lines signal electrifies the storage capacitor to be able to keep the MOSFET continuously switched on such that the light emitting element L continuously emits light. Controlling a power-on time of the driver transistor MOSFET controls brightness of the light emitting element L to present a specific first grayscale value (for example first grayscale value 0 to 63) in the grayscale range to achieve a corresponding brightness value, which achieves a divisional light adjustment function to the backlight division 10. Furthermore, when the light emitting element is a light emitting diode, a presentation way of the actual brightness value corresponding to each first grayscale value is distinguished by a lighting-up time length of the light emitting diode. For example, when the lighting-up time length of the light emitting element L is shorter, a presented actual brightness values is lower, and when the lighting-up time length is longer, the presented actual brightness values is higher.

In a preferred embodiment of the present application, each of the backlight divisions comprises a plurality of light emitting element L, the light emitting element L is configured to output the actual brightness values according to the first grayscale values in the grayscale range.

Furthermore, the pixel grayscale range of the pixel sets 20 of the display panel 2 can be twice to four times the grayscale range of the backlight divisions 10. For example, the pixel grayscale range comprises 256 first grayscale values (grayscale levels 0 to 255), and the grayscale range of the backlight divisions 10 comprises 64 first grayscale values (grayscale levels 0 to 63).

In another aspect, the present application provides the display device comprising: a backlight module 1 and a display panel 2.

The backlight module 1 is divided into a plurality of backlight divisions 10. The backlight module 1 comprises a brightness control unit 12 configured to control each of the backlight divisions 10 to perform divisional light adjustment.

Figure 8:
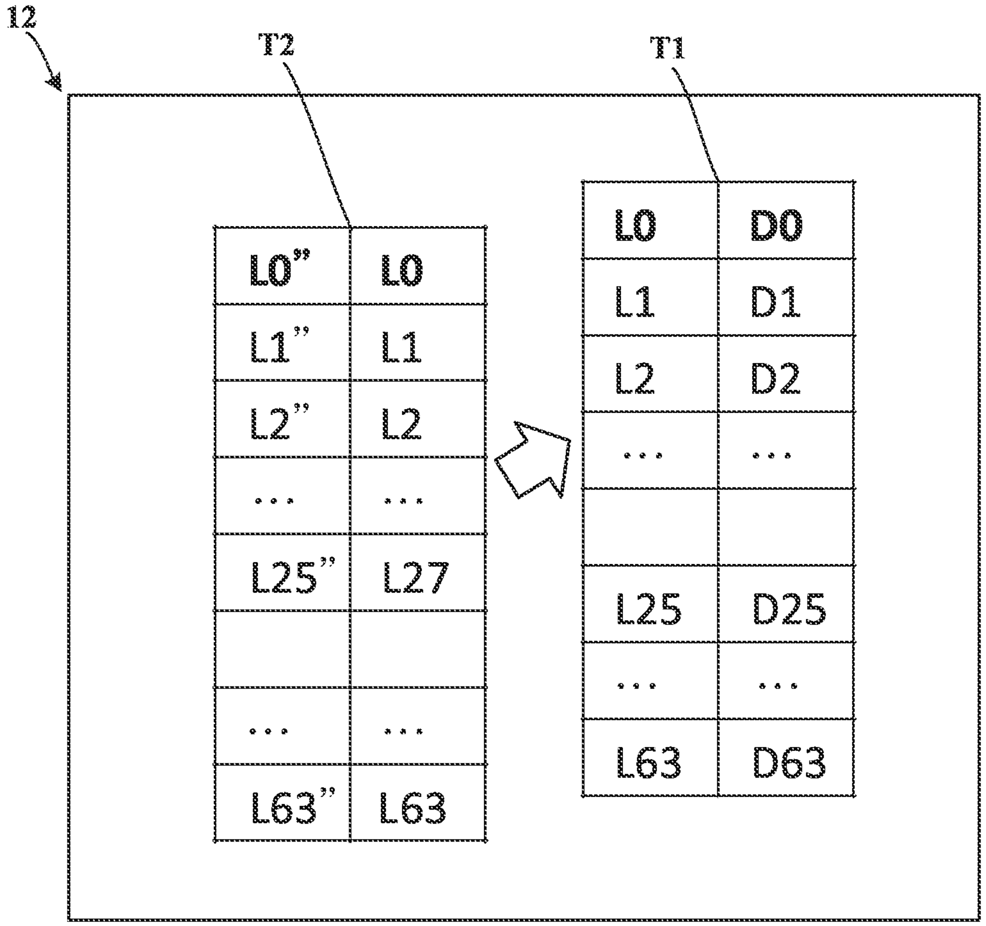
FIG. 8 is a schematic view of a brightness control unit of the display device backlight module brightness calibration method provided by the embodiment of the present application.

With reference to FIG. 8, the display panel 2 is disposed on the backlight module 1. The brightness control unit 12 comprises a grayscale driving reference table T1 and a grayscale calibration table T2. The grayscale driving reference table T1 comprises a plurality of first grayscale values of a grayscale range corresponding to t least one of the backlight divisions 10 and driving values D0-D63 corresponding to each of the first grayscale values L0-L63. The grayscale calibration table T2 comprises a plurality of second grayscale values L0"-L63", each of the second grayscale values L0"-L63" are mapped to one of the first grayscale values L0-L63 of the grayscale driving reference table T1, and the actual brightness value of the backlight division 10 corresponding to any smaller one of the second grayscale values L0"-L63" is less than the actual brightness value of the backlight division 10 corresponding to any greater one of the second grayscale values.

Specifically, the backlight module 1 employs pulse-width modulation (PWM) to drive the light emission assembly L, the driving values D0-D63 are pulse widths, the pulse widths can be composed of widths of different time lengths. For example, SF1=65 μs, SF2=130 μs, SF3=260 μs, SF4=520 μs, SF5=1.04 ms, SF6=2.08 ms. Six different widths SF1-SF6 produce sixty-four different time lengths.

In some embodiments of the present application, the brightness control unit comprises a plurality of grayscale driving reference tables, and each of the grayscale driving reference tables corresponds to one of the backlight divisions 10.

In some embodiments of the present application, each of the backlight divisions 10 comprises a light emitting element L, the light emitting element L is configured to output the actual brightness values according to the first grayscale values in the grayscale range.

Figure 9:
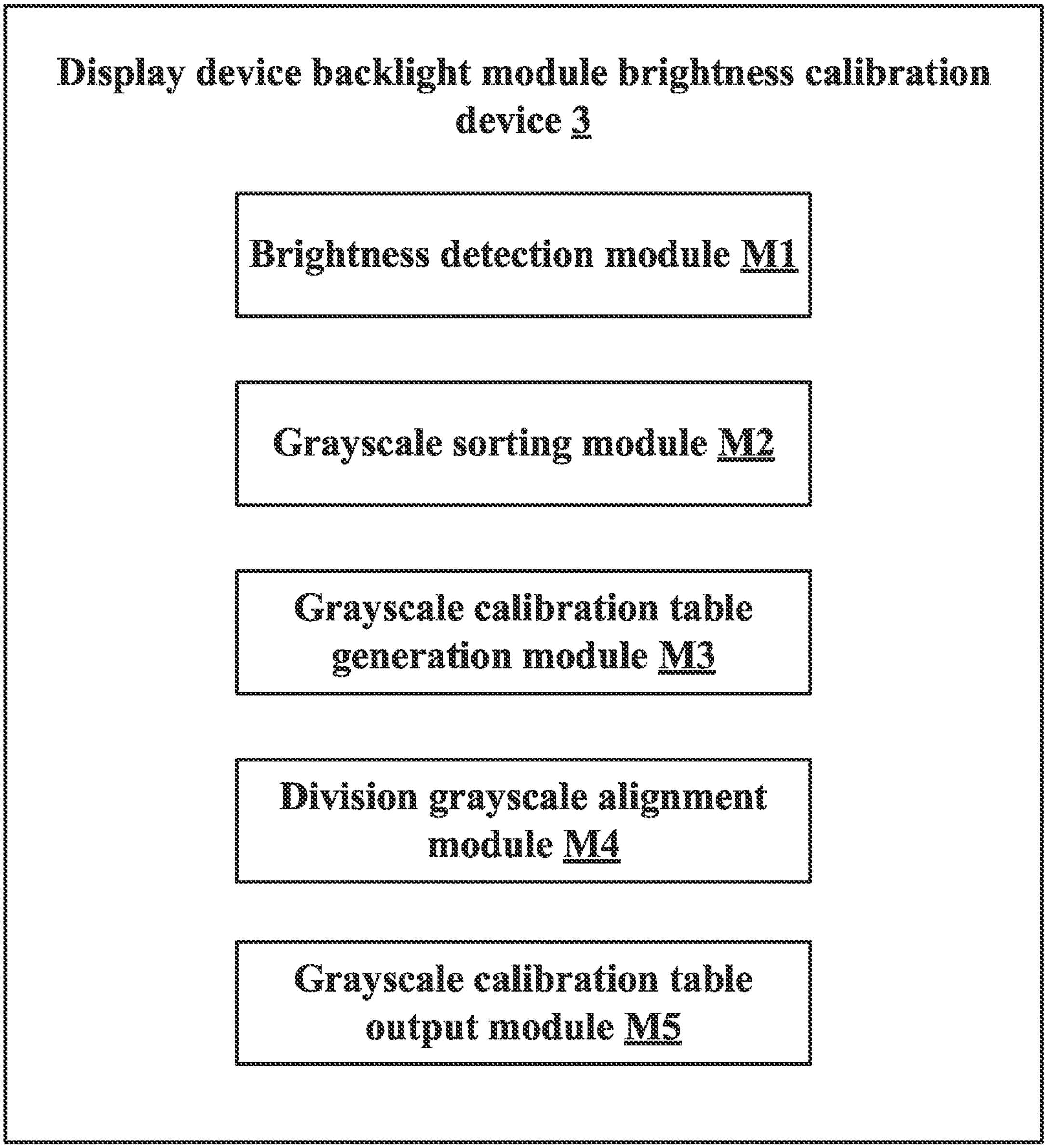
FIG. 9 is a schematic framework diagram of the display device backlight module brightness calibration device provided by the embodiment of the present application.

With reference to FIG. 9, in another aspect, the backlight module brightness calibration device 3 for the display device provided by the present application comprises: a brightness detection module M1, grayscale sorting module M2, a grayscale calibration table generation module M3, and a grayscale calibration table output module M5. Each of the above modules can be a computer module installed into the display device and comprise a processor, a memory, a storage device, and a built-in software for implementing functions required by the module. Alternatively, the above modules are software modules are commonly installed in the single computer module. Alternatively, the above modules are software module are commonly installed in a computer module of a brightness calibrator that is individual from the display device, and the brightness calibrator is configured to detect the backlight module and is electrically connected to the brightness control unit of the backlight module for calibration data exchange.

The brightness detection module M1 is configured to detect a plurality of actual brightness values of a plurality of first grayscale values of at least one of the backlight divisions 10 of a backlight module 1 of the display device.

The grayscale sorting module M2 is configured to resort the first grayscale values according to a brightness value sequence of the actual brightness values.

The grayscale calibration table generation module M3 is configured to establish a grayscale calibration table corresponding to the backlight division 10 according to the first grayscale values resorted, wherein the grayscale calibration table comprises a plurality of second grayscale values, the second grayscale values are mapped to the first grayscale values re-sorted, and the actual brightness value corresponding to any smaller one of the second grayscale values is less than the actual brightness value corresponding to any greater one of the second grayscale values.

The grayscale calibration table output module M5 is configured to connect a brightness control unit of the backlight module 1 a through a transmission line to output and store the grayscale calibration table into the brightness control uni.

In a preferred embodiment of the present application, the brightness detection module M1 is further configured to: detecting the actual brightness values of the first grayscale values in a grayscale range corresponding to each of the backlight divisions 10 of the backlight module 1 of the display device;

the grayscale calibration table generation module M3 is further configured to: establish the grayscale calibration tables corresponding to the backlight divisions according to the first grayscale values resorted in each of the backlight divisions 10, wherein each of the grayscale calibration table comprises a plurality of second grayscale values, the second grayscale values are mapped to the first grayscale values re-sorted, and the actual brightness value corresponding to any smaller one of the second grayscale values is less than the actual brightness value corresponding to any greater one of the second grayscale values; and the grayscale calibration table output module M5 is further configured to: connect a brightness control unit of the backlight module 1 through a transmission line to output and store the grayscale calibration tables into the brightness control unit.

In a preferred embodiment of the present application, the backlight module brightness calibration device 3 of the display device further comprises division grayscale alignment module M4 configured to fine-adjust a brightness value of a light emitting element of each of the backlight divisions such that the same second grayscale values in the grayscale calibration tables corresponding to the same actual brightness values. Particularly, the division grayscale alignment module M4 is configured to implement a division grayscale alignment function after the grayscale calibration table generation module M3 implements the grayscale calibration function.

The present application at least comprises advantages as follows:

The display device, the display device backlight module brightness calibration method, and the backlight module brightness calibration device for the display device provided by the present application, re-sort the first grayscale values of the grayscale range of the backlight divisions according to actual brightness values of the display device to acquire the grayscale calibration tables, and output and store the grayscale calibration tables to the brightness control unit to control the backlight module to display correct brightness, which further mitigate or avoid the technical issue of discontinuity or jump variation of a grayscale transition of a backlight module of a conventional display device.

In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A backlight module brightness calibration method for a display device, comprising:

a brightness detection step comprising detecting a plurality of actual brightness values of a plurality of first grayscale values of at least one of backlight divisions of a backlight module of the display device, wherein each of the first gray values is detected from one of light emitting elements of one of the backlight divisions;

a grayscale sorting step comprising re-sorting the first grayscale values according to a brightness value sequence of the actual brightness values;

a grayscale calibration table generation step comprising establishing a grayscale calibration table corresponding to the backlight division according to the first grayscale values re-sorted, wherein the grayscale calibration table comprises a plurality of second grayscale values, the second grayscale values are mapped to the first grayscale values re-sorted, and the re-sorting results in the actual brightness value corresponding to any smaller one of the second grayscale values is less than the actual brightness value corresponding to any greater one of the second grayscale values; and a grayscale calibration table output step comprising outputting the grayscale calibration table.

2. The backlight module brightness calibration method for a display device according to claim 1, wherein the brightness detection step further comprises: detecting the actual brightness values of the first grayscale values in a grayscale range corresponding to each of the backlight divisions of the backlight module of the display;

the grayscale calibration table generation step further comprises: establishing grayscale calibration tables corresponding to the backlight divisions according to the first grayscale values re-sorted in each of the backlight divisions, wherein each of the grayscale calibration tables comprises the second grayscale values, the second grayscale values are mapped to the first grayscale values re-sorted, and the actual brightness value corresponding to any smaller one of the second grayscale values is less than the actual brightness value corresponding to any greater one of the second grayscale values; and the grayscale calibration table output step further comprises: connecting a brightness control unit of the backlight module through a transmission line to output and store the grayscale calibration tables into the brightness control unit.

3. The backlight module brightness calibration method for a display device according to claim 2, wherein after the grayscale calibration table generation step, the method further comprises a division grayscale alignment step comprising fine-adjusting a brightness value of one of the light emitting elements of each of the backlight divisions such that the actual brightness values corresponding to the same second grayscale value in the grayscale calibration tables are equal.

4. The backlight module brightness calibration method for a display device according to claim 1, wherein in the grayscale sorting step, the brightness value sequence is a sequence of the actual brightness values in an increasing arrangement or a decreasing arrangement.

5. The backlight module brightness calibration method for a display device according to claim 1, wherein each of the backlight divisions comprises a light emitting element, the light emitting element is configured to output the actual brightness values according to the first grayscale values in a grayscale range corresponding to each of the backlight divisions of the backlight module of the display; and the brightness control unit is configured to control each of the backlight divisions to perform divisional light adjustment.

6. The backlight module brightness calibration method for a display device according to claim 1, wherein the brightness detection step further comprises: detecting the actual brightness values of the first grayscale values in a grayscale range corresponding to each of the backlight divisions of the backlight module of the display device;

the grayscale calibration table generation step further comprises: establishing grayscale calibration tables corresponding to the backlight divisions according to the first grayscale values re-sorted in each of the backlight divisions, wherein each of the grayscale calibration tables comprises the second grayscale values, the second grayscale values are mapped to the first grayscale values re-sorted, and the actual brightness value corresponding to any smaller one of the second grayscale values is less than the actual brightness value corresponding to any greater one of the second grayscale values;

the grayscale calibration table output step further comprises: connecting a brightness control unit of the backlight module through a transmission line to output and store the grayscale calibration tables into the brightness control unit;

after the grayscale calibration table generation step, the method further comprises a division grayscale alignment step comprising fine-adjusting a brightness value of a light emitting element of each of the backlight divisions such that the actual brightness values corresponding to the same second grayscale value in the grayscale calibration tables are equal;

in the grayscale sorting step, the brightness value sequence is a sequence of the actual brightness values in an increasing arrangement or a decreasing arrangement;

each of the backlight divisions comprises a light emitting element, the light emitting element is configured to output the actual brightness values according to the first grayscale values in the grayscale range; and the brightness control unit is configured to control each of the backlight divisions to perform divisional light adjustment.

7. A display device, comprising:

a backlight module, wherein the backlight module is divided into a plurality of backlight divisions, and the backlight module comprises a brightness control unit configured to control each of the backlight divisions to perform divisional light adjustment; and a display panel disposed on the backlight module, wherein the brightness control unit comprises a grayscale driving reference table and a grayscale calibration table, the grayscale driving reference table comprise a plurality of first grayscale values of at least one of the backlight divisions and a driving value corresponding each of the first grayscale values, each of the first gray values is detected from one of light emitting elements of one of the backlight divisions, the grayscale calibration table comprises a plurality of second grayscale values, each of the second grayscale values is mapped to one of the first grayscale values of the grayscale driving reference table, and the first gray scale values of the grayscale driving reference table are re-sorted according to a brightness value sequence of actual brightness values, such that the actual brightness value of the backlight division corresponding to any smaller one of the second grayscale values is less than the actual brightness value of the backlight division of any greater one of the second grayscale values.

8. The display device according to claim 7, wherein the brightness control unit comprises a plurality of grayscale driving reference tables, and each of the grayscale driving reference tables corresponds to one of the backlight divisions.

9. The display device according to claim 7, wherein each of the backlight divisions comprises one of the light emitting elements of each of the backlight divisions, the light emitting element is configured to output the actual brightness values according to the first grayscale values in a grayscale range corresponding to each of the backlight divisions of the backlight module of the display.

10. The display device according to claim 7, wherein the brightness control unit comprises a plurality of grayscale driving reference tables, and each of the grayscale driving reference tables corresponds to one of the backlight divisions; and each of the backlight divisions comprises a light emitting element, and the light emitting element is configured to output the actual brightness values according to the first grayscale values in a grayscale range corresponding to each of the backlight divisions of the backlight module of the display.

11. A backlight module brightness calibration device for a display device, comprising:

a brightness detection module configured to detect a plurality of actual brightness values of a plurality of first grayscale values of at least one of backlight divisions of a backlight module of the display device, wherein each of the first gray values is detected from one of light emitting elements of one of the backlight divisions;

a grayscale sorting module configured to re-sort the first grayscale values according to brightness value sequence of the actual brightness values;

a grayscale calibration table generation module configured to establish a grayscale calibration table corresponding to the backlight division according to the first grayscale values re-sorted, wherein the grayscale calibration table comprises a plurality of second grayscale values, the second grayscale values are mapped to the first grayscale values re-sorted, and the re-sorting results in the actual brightness value corresponding to any smaller one of the second grayscale values is less than the actual brightness value corresponding to any greater one of the second grayscale values; and a grayscale calibration table output module configured to output the grayscale calibration table.

12. The backlight module brightness calibration device for a display device according to claim 11, wherein the brightness detection module is further configured to: detecting the actual brightness values of the first grayscale values in a grayscale range corresponding to each of the backlight divisions of the backlight module of the display device;

the grayscale calibration table generation module is further configured to establish grayscale calibration tables corresponding to the backlight divisions according to the first grayscale values re-sorted in each of the backlight divisions, wherein each of the grayscale calibration table comprises a plurality of second grayscale values, the second grayscale values are mapped to the first grayscale values re-sorted, and the actual brightness value corresponding to any smaller one of the second grayscale values is less than the actual brightness value corresponding to any greater one of the second grayscale values; and the grayscale calibration table output module is further configured to connect a brightness control unit of the backlight module through a transmission line to output and store the grayscale calibration tables into the brightness control unit.

* * * * *